United States Patent
Bouillon et al.

(10) Patent No.: US 11,512,666 B2
(45) Date of Patent: Nov. 29, 2022

(54) ACOUSTIC TREATMENT STRUCTURE FOR AN AIRCRAFT PROPULSION UNIT NACELLE

(71) Applicants: Safran Nacelles, Gonfreville L'Orcher (FR); Safran Ceramics, Le Haillan (FR)

(72) Inventors: Florent Bouillon, Moissy Cramayel (FR); Franck Dupe, Bordeaux (FR); Benoît Carrere, Le Taillan Medoc (FR); Bertrand Desjoyeaux, Moissy Cramayel (FR)

(73) Assignees: Safan Nacelles, Gonfreville l'Orcher (FR); Safran Ceramics, Le Haillan (FR)

( * ) Notice: Subject to any disclaimer, the term of this patent is extended or adjusted under 35 U.S.C. 154(b) by 155 days.

(21) Appl. No.: 16/921,163

(22) Filed: Jul. 6, 2020

(65) Prior Publication Data

US 2020/0339243 A1    Oct. 29, 2020

Related U.S. Application Data

(63) Continuation of application No. PCT/EP2019/050018, filed on Jan. 4, 2019.

(30) Foreign Application Priority Data

Jan. 5, 2018  (FR) ..................................... 18/50079

(51) Int. Cl.
| | | |
|---|---|---|
| *F02K 1/82* | (2006.01) | |
| *F02K 1/34* | (2006.01) | |
| *F02C 7/045* | (2006.01) | |

(52) U.S. Cl.
CPC .............. *F02K 1/827* (2013.01); *B64D 33/06* (2013.01); *F02C 7/045* (2013.01); *F05D 2260/963* (2013.01)

(58) Field of Classification Search
CPC . F02K 1/82; F02K 1/827; B64D 33/06; F02C 7/045; F05D 2260/963
See application file for complete search history.

(56) References Cited

U.S. PATENT DOCUMENTS

| | | | | |
|---|---|---|---|---|
| 4,235,303 A | * | 11/1980 | Dhoore .................. | B64D 33/02 428/6 |
| 4,384,634 A | | 5/1983 | Shuttleworth et al. | |

(Continued)

FOREIGN PATENT DOCUMENTS

| | | | | |
|---|---|---|---|---|
| FR | 2934641 | | 2/2010 | |
| FR | 3041937 | | 4/2017 | |
| WO | WO-2016146924 A1 | * | 9/2016 | ............. B64D 33/02 |

OTHER PUBLICATIONS

International Search Report for International Application PCT/FR2019/050018, dated Apr. 5, 2019.

*Primary Examiner* — Steven M Sutherland
(74) *Attorney, Agent, or Firm* — Burris Law, PLLC

(57) ABSTRACT

A structure for the nacelle of an aircraft propulsion unit includes a first skin and stiffeners arranged to hold acoustic treatment modules against the first skin. Each acoustic treatment module includes a honeycomb core and a second skin, such that the honeycomb core is sandwiched between the first skin and the second skin. Such a structure allows the structural reinforcement function provided by the stiffeners to be separated from the acoustic treatment function performed by the acoustic treatment modules which are simply bearing on the first skin.

15 Claims, 6 Drawing Sheets

(56) References Cited

U.S. PATENT DOCUMENTS 5,594,216 A 1/1997 Yasukawa et al.
2011/0133025 A1\* 6/2011 Vauchel ................. F02C 7/045
　　　　　　　　　　　　　　　　　　　244/1 N \* cited by examiner

ACOUSTIC TREATMENT STRUCTURE FOR AN AIRCRAFT PROPULSION UNIT NACELLE

CROSS-REFERENCE TO RELATED APPLICATIONS

This application is a continuation of International Application No. PCT/FR2019/050018, filed on Jan. 4, 2019, which claims priority to and the benefit of FR 18/50079 filed on Jan. 5, 2018. The disclosures of the above applications are incorporated herein by reference.

FIELD

The present disclosure relates to the field of acoustic treatment of aircraft propulsion unit nacelles.

BACKGROUND

The statements in this section merely provide background information related to the present disclosure and may not constitute prior art.

To attenuate the noise generated by a propulsion unit, for example a turbojet engine, several structures or parts of the nacelle generally comprise acoustic panels.

An acoustic panel typically comprises two skins and a cellular core of the honeycomb type clasped between the two skins. The cellular core consists of transverse partition walls contributing to the structural holding of the panel, in particular by providing the connection between the two skins. One of the skins, oriented toward the noise source, is acoustically permeable in order to capture the acoustic waves and to reduce the acoustic energy within the cellular core.

In a nacelle of a bypass turbojet engine, the ejection cone and the primary nozzle of the exhaust conduit typically comprise such acoustic panels.

To support the thermal and mechanical stresses to which they are exposed, the acoustic panels of the exhaust conduit are typically made of superalloys or composite materials with a ceramic matrix which make their manufacture expensive.

SUMMARY

This section provides a general summary of the disclosure and is not a comprehensive disclosure of its full scope or all of its features.

The present disclosure provides a structure provided with an acoustic treatment function for an aircraft propulsion unit nacelle reducing manufacturing costs and providing good thermomechanical performance, particularly when this structure constitutes all or part of an ejection cone or a primary nozzle of an exhaust conduit.

To this end, the present disclosure relates to a structure for an aircraft propulsion unit nacelle comprising a first skin, stiffeners affixed to the first skin to stiffen this first skin, and acoustic treatment modules. Each acoustic treatment module comprises a cellular core and a second skin fixed to the cellular core. The first skin and the acoustic treatment modules are arranged so that the cellular core of each module is clasped between the corresponding second skin and the first skin. The first skin or the second skin of the acoustic treatment module(s) is acoustically permeable to attenuate the power of the acoustic waves, more specifically acoustic waves propagating on the surface of the acoustically permeable skin, in the cellular core of the acoustic treatment modules.

The expression "acoustically permeable skin" means a skin permeable to acoustic waves, i.e. arranged to let acoustic waves pass, for example through orifices made in this skin.

By way of non-limiting example, an acoustically permeable skin may comprise orifices having an acoustic opening rate comprised between 2% and 20%, the size of each orifice being at least one tenth of a millimeter (0.1 mm) in diameter, and in one form more than 0.2 mm.

Each acoustic treatment module is embedded between two respective stiffeners, and each acoustic treatment module is in simple bearing on the first skin and comprises holding elements arranged to hold each acoustic treatment module against the first skin.

In the present document, the expression "simple bearing" means a contact between two surfaces authorizing a relative mobility from one surface to the other surface. In this case, the surfaces in simple bearing are in the present disclosure a surface of the first skin and a surface constituted by the ends of transverse partition walls forming the cellular core. Thus, the cellular core of the acoustic treatment modules is not fixed to the first skin, for example by welding or brazing. Each acoustic treatment module is therefore movable relative to the first skin.

Such a structure makes it possible to decouple the structural function and the acoustic treatment function so that the cellular core and the second skin can be made of a material different from the material of the first skin and the stiffeners without the acoustic treatment modules are subjected to strong mechanical stresses under the effect of an increase in temperature.

For example, the first skin and/or the stiffeners may comprise or be made of a composite material with a ceramic matrix or a superalloy.

The acoustic treatment modules, that is to say the cellular core and/or the second skin of these acoustic treatment modules, can comprise or be made of a metallic material such as titanium or a nickel-based alloy.

In this way, it is possible to reduce the manufacturing cost while giving this structure good thermomechanical performance, in particular to support the thermal and mechanical stresses to which the structure is exposed when it constitutes all or part of an ejection cone or a primary nozzle of the exhaust conduit.

Indeed, the dissociation of the structural and acoustic functions allows such a structure to resist the differential thermal expansions linked to the different materials that compose it since the acoustic treatment modules have a certain mobility relative to the first skin at least in a parallel direction to the surface of the first skin.

The cellular cores of such a structure therefore in principle have no role of structural holding or stiffening of the structure, this role being provided by the first skin and by the stiffeners.

Furthermore, the present disclosure makes it possible to facilitate the manufacture of acoustic treatment modules, the structure could comprise a large number of small modules. Manufacturing is a fortiori facilitated when the geometry of the structure is complex, for example when the structure constitutes all or part of an ejection cone of the exhaust conduit. In particular, in these examples, the first skin may have a concave or convex shape.

Advantageously, such a structure also facilitates maintenance operations. For example, in the event of local deterioration of the structure, it is possible to replace an acoustic treatment module without replacing the other modules. For another example, in the event of deterioration of the acoustically permeable skin, it can be repaired independently after removal of the acoustic treatment module(s) and then, after repair, by reinstalling the acoustic treatment module bearing on the repaired skin.

Another advantage is linked to the fact that the acoustic treatment modules can be interchangeable with one another.

In another form, the holding elements can cooperate with the second skin of each acoustic treatment module so as to exert a force for holding the acoustic treatment modules against the first skin.

In one form of the present disclosure, the stiffeners can constitute at least one portion of the holding elements.

To do this, the stiffeners can have a "T" or "[" section.

More specifically, in one form of the present disclosure, each stiffener may comprise a first element forming a stop for one or more acoustic treatment modules so as to limit the displacement of this or these acoustic treatment modules in a direction tangential to the first skin. Each stiffener may also comprise a second element forming a stop for one or more acoustic treatment modules so as to limit the displacement of this or these acoustic treatment modules in a direction normal to the first skin. The second element of the stiffener can thus constitute at least one portion of the holding elements.

In one form of the present disclosure, the holding elements may comprise elastic blades fixed on the stiffeners.

In this document, the term "elastic" refers to the mechanical property of a member arranged to at least partially resume its shape and its volume after being subjected to a compressive force or displacement. Thus, an elastic blade or an elastic element within the meaning of this document typically behaves in the same way as a compression spring.

In other words, a blade or an elastic element is a mechanical body having such a geometry and a material such that this body allows, under the effect of its deformation when it is subjected to a compressive force, to create a reciprocal mechanical force.

In one form of the present disclosure, the holding elements can comprise one or more lateral elastic elements arranged to exert lateral pressure of the acoustic treatment modules against the respective stiffeners between which these acoustic treatment modules are embedded, so as to immobilize these acoustic treatment modules in a tangential direction at the first skin.

Alternatively or additionally, the holding elements may comprise one or more transverse elastic elements arranged to exert transverse pressure of the acoustic treatment modules against the first skin, so as to immobilize these acoustic treatment modules in a direction normal to the first skin.

Such lateral and/or transverse elastic elements allow or improve the holding of the acoustic treatment modules in the structure.

In one form of the present disclosure, the lateral or transverse elastic elements can be formed by the second skin and/or the cellular core of the acoustic treatment modules, for example by protrusions forming springs.

The present disclosure also concerns an exhaust conduit of an aircraft propulsion unit nacelle comprising a structure as described above as well as an aircraft propulsion unit nacelle comprising such a structure or such an exhaust conduit.

In one form of the present disclosure, the stiffeners of the structure can extend in respective directions parallel to a longitudinal axis of the nacelle.

In another form of the present disclosure, the stiffeners of the structure can extend circumferentially about a longitudinal axis of the nacelle.

Other orientations can be given to the stiffeners.

The choice of the orientation of the stiffeners, their position, their spacing and their respective geometry can allow, on the one hand, facilitating the installation and the holding of the acoustic treatment modules. On the other hand, this can also offer overall rigidities to the structure thus stiffened, by reducing vibrational eigenmodes in frequency domains prohibited by the operating environment.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
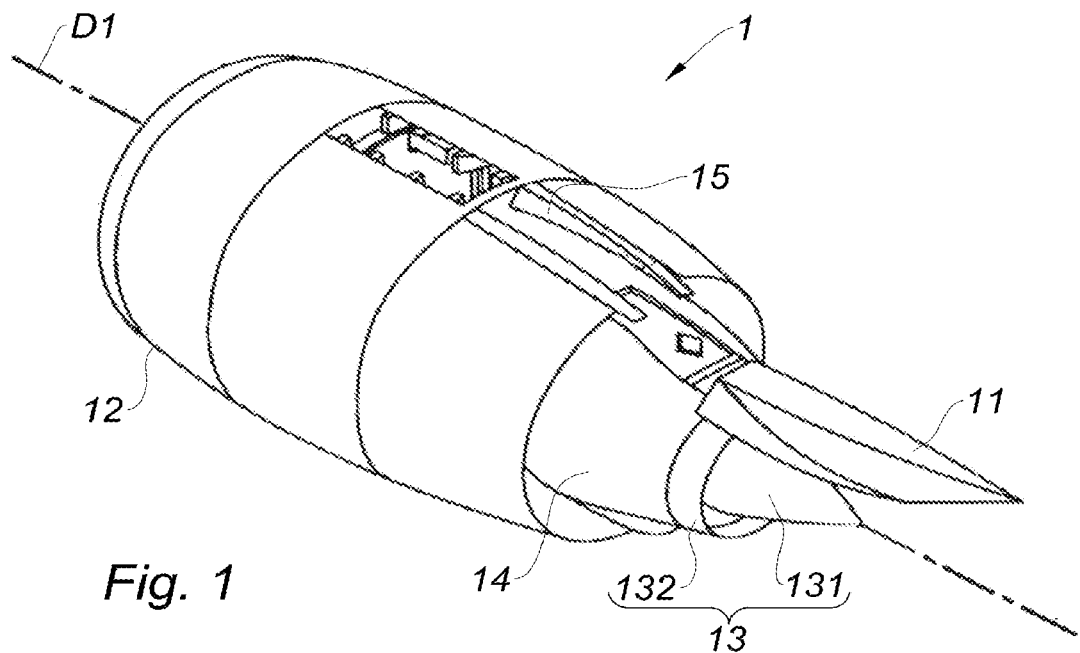
FIG. 1 is a schematic perspective view of an aircraft turbojet engine nacelle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An aircraft propulsion unit nacelle 1 is illustrated in FIG. 1. This nacelle 1 comprises an engine pylon 11 and a bypass turbojet engine type engine (not represented) housed in the nacelle 1. The engine pylon 11, partially represented, is intended to be fixed to a wing (not represented) or to the fuselage (not represented) of the aircraft.

The nacelle comprises an air inlet 12 adapted to improve capture of the air for the supply of a fan (not represented) and inner compressors (not represented) to the turbojet engine.

The nacelle 1 extends along a longitudinal axis D1 represented coincident with the axis of the engine.

Under the engine pylon 11 (mast), downstream of the turbojet engine, the nacelle 1 comprises an exhaust conduit 13 including an ejection cone 131 ("plug") and a primary nozzle 132. The ejection cone 131 and the primary nozzle 132 of the exhaust conduit 13 define a passage for a hot air flow exiting the turbojet engine.

The nacelle 1 further comprises an inner fixed structure 14 and an outer structure 15 which define a passage for a cold air flow from the turbojet engine.

The present disclosure concerns a structure capable of including all or part of one or more parts of the nacelle 1 such as the ejection cone 131 or the primary nozzle 132 of the exhaust conduit 13.

Figure 2:
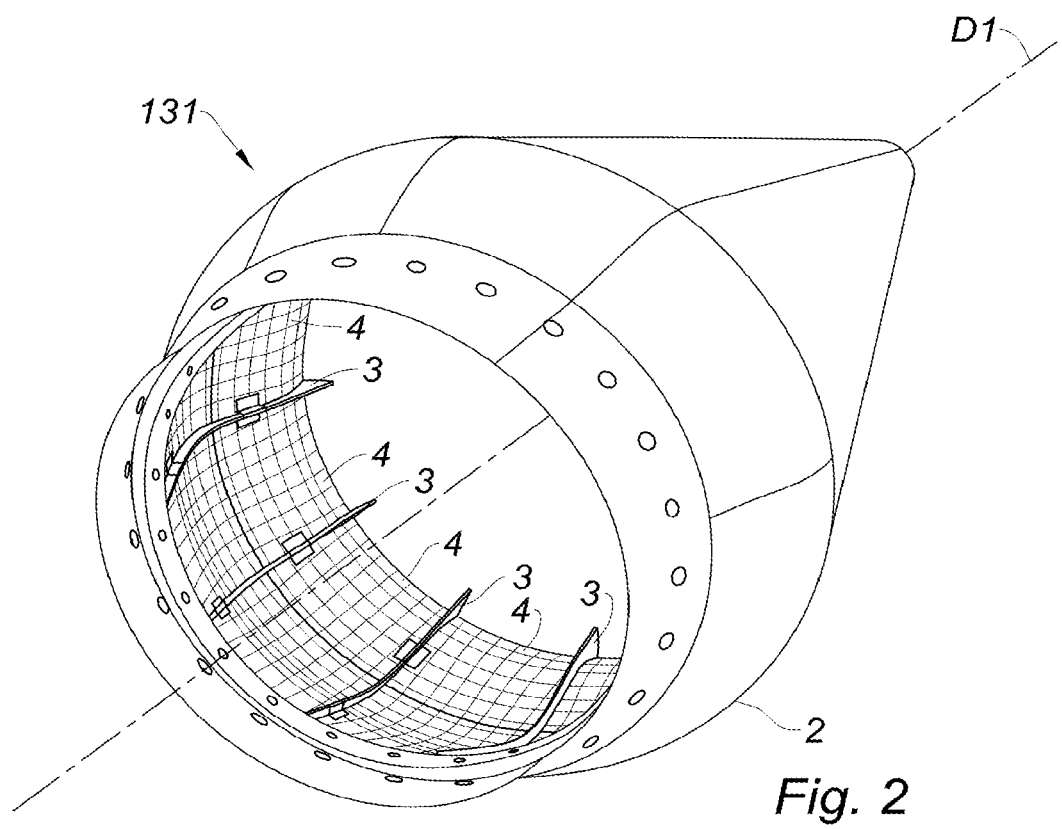
FIG. 2 is a schematic perspective view of an ejection cone of the exhaust conduit according to the present disclosure, comprising a first variant of the holding elements.

In the example of FIG. 2, this structure is an ejection cone 131.

Figure 3:
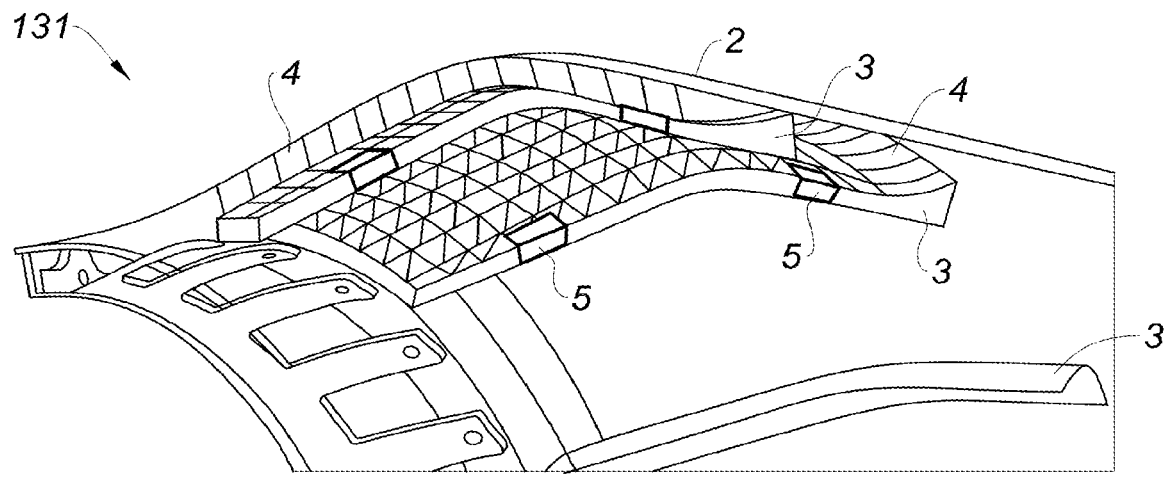
FIG. 3 is a partial schematic perspective view of a section of the ejection cone of FIG. 2.
Figure 4:
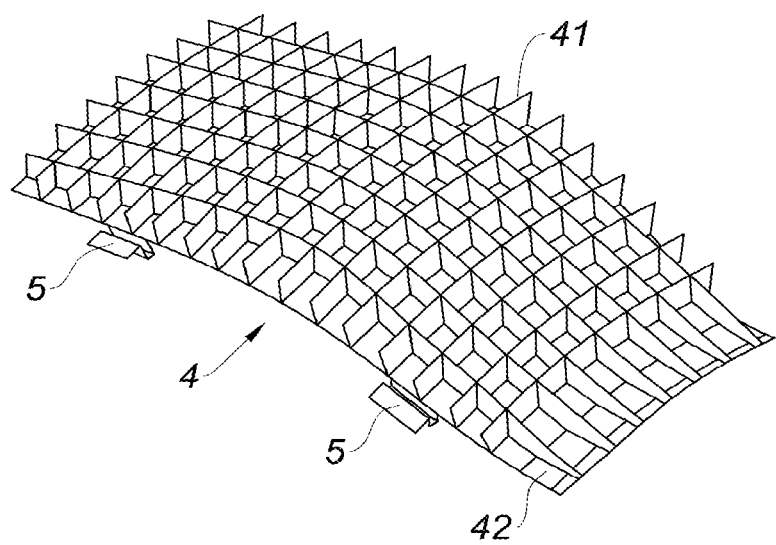
FIG. 4 is a schematic perspective view of an acoustic treatment module of the ejection cone of FIG. 2.

With reference to FIGS. 2 to 4, the structure 131 (ejection cone) according to the present disclosure comprises a first skin 2.

This first skin 2 comprises an outer surface intended to be in contact with the hot air flow exiting the turbojet engine.

To reinforce the structural strength of the first skin 2, the structure comprises stiffeners 3.

In this example, the stiffeners 3 form reinforcing bars which extend parallel to the longitudinal axis D1 and regularly spaced around the circumference of the ejection cone 131.

These stiffeners 3 extend here from an inner surface of the first skin 2, i.e. toward the inside of the ejection cone 131.

The stiffeners 3 are fixed to the first skin 2. For example, the stiffeners 3 can be attached elements fixed to the first skin 2 by brazing or welding. Alternatively, the stiffeners 3 and the first skin 2 can be made in one piece, for example by draping fibrous folds on a mold.

The number of stiffeners 3 should in particular be determined so as to provide good vibratory and mechanical stability of the first skin 2, as a function of the stresses to which the structure 131 will be subjected.

The structure 131 further comprises acoustic treatment modules 4.

With reference to FIG. 4, each acoustic treatment module 4 comprises a cellular core 41 and a second skin 42 fixed to the cellular core 41.

The cellular core 41 comprises transverse foils forming cavities intended to constitute Helmholtz cavities. The geometry of these cavities can be adapted to manufacturing stresses and frequencies to be attenuated. In the example of FIG. 4, each cavity is delimited by four foils and therefore has a quadrilateral section. In another exemplary form, not illustrated, the cavities may have a hexagonal section.

Figure 12:
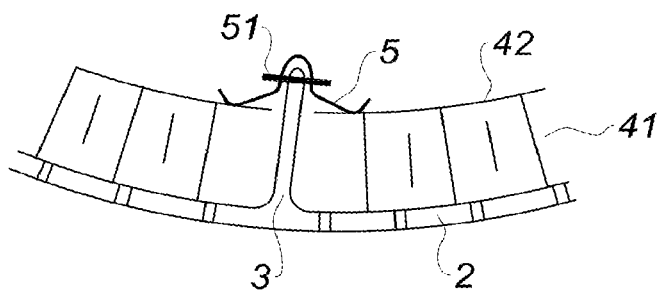
FIG. 12 is a cross-sectional partial schematic view of the structure of FIG. 11.

With reference to FIGS. 3, 4, and 12, the first skin 2 and the acoustic treatment modules 4 are arranged so that the cellular core 41 of each acoustic treatment module 4 is clasped between the corresponding second skin 42 and the first skin 2. The second skin 42 is not represented on the acoustic treatment modules 4 of FIG. 3: this arrangement nonetheless emerges clearly from FIG. 12 which shows an example of cross-sectional view of the structure according to the present disclosure.

According to the present disclosure, each acoustic treatment module 4 is embedded between two respective stiffeners 3 (see FIG. 2).

Thus, the stiffeners 3 also have the function of positioning and holding the acoustic treatment modules 4 in a fixed position relative to the first skin 2 at least in a tangential direction relative to the first skin 2.

To hold the acoustic treatment modules 4 against the first skin 2, the structure 131 comprises holding elements 5.

In the example of FIGS. 2 to 4, 11, and 12, the holding elements 5 comprise elastic blades 5 fixed on the stiffeners 3 fixing elements 51 of the rivet type (see FIG. 12). For example, two elastic blades 5 can thus be fixed on each stiffener 3.

In this example, each elastic blade 5 extends on either side of a stiffener 3 so as to bear against the second skin 42 of the acoustic treatment modules 4 located on either side of this stiffener 3 (see FIG. 12).

According to the present disclosure, each acoustic treatment module 4 is simply bearing on the first skin 2.

In this way, the acoustic treatment modules 4 are free from the structural stresses to which the first skin 2 is subjected.

The modules 4 are intended to provide an acoustic treatment to the nacelle 1.

In the example of the ejection cone 131 of FIG. 2, the first skin 2 is made acoustically permeable, for example by orifices (not represented) made in the first skin 2. Such orifices make it possible to capture and attenuate, within the cellular core of the acoustic treatment modules 4, acoustic waves which are propagated at the level of the outer surface of the first skin 2.

In a form not represented, the attenuation of acoustic waves within the cellular core of the acoustic treatment modules 4 could be achieved by making the second skin 42 acoustically permeable, the first skin 2 being acoustically impermeable. In this case, the attenuated waves would be waves propagating at an outer surface of the second skin 42 of the acoustic treatment modules 4.

Figure 8:
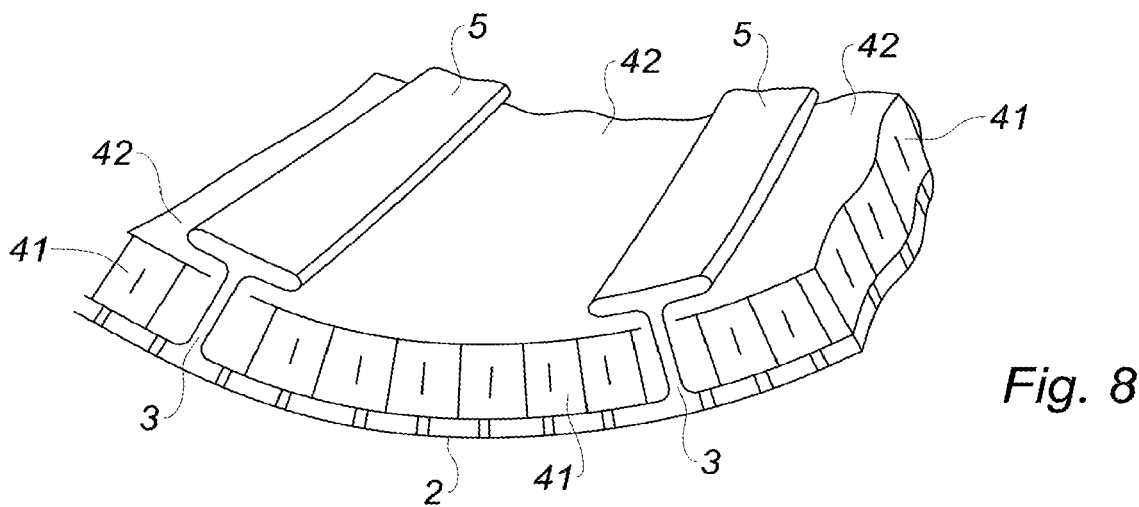
FIG. 8 is a partial schematic perspective view of a structure according to the present disclosure, comprising a third variant of the holding elements.

FIG. 8 shows another form in which the stiffeners 3 constitute the holding elements. Particularly, each stiffener 3 comprises a first element forming a stop for two adjacent acoustic treatment modules so as to limit the displacement of these acoustic treatment modules in a direction tangential to the first skin 2. Each stiffener 3 also comprises a second element forming a stop for two adjacent acoustic treatment modules so as to limit the displacement of these acoustic treatment modules in a direction normal to the first skin 2.

The second elements of the stiffeners 3 thus constitute the holding elements 5. In this example, the stiffeners 3 have a "T" section.

It emerges from the examples described here that the holding elements 5 cooperate with the second skin 42 of each acoustic treatment module 4 to exert a force for holding the acoustic treatment modules 4 against the first skin 2.

Figure 5:
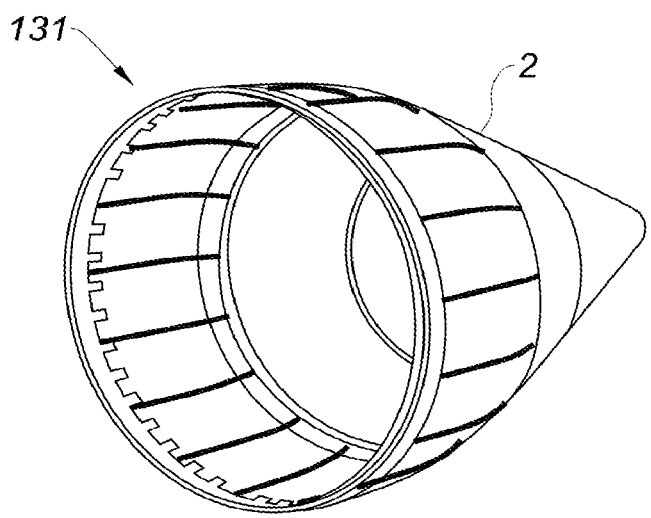
FIG. 5 is a schematic perspective view of an ejection cone of the exhaust conduit according to the present disclosure, comprising a second variant of the holding elements.

In the forms of FIGS. 2 and 5, the stiffeners 3 extend in respective directions parallel to the longitudinal axis D1 of the nacelle 1 when the structure 131 (for example in FIG. 2) is installed on the nacelle 1 (FIG. 1).

Figure 9:
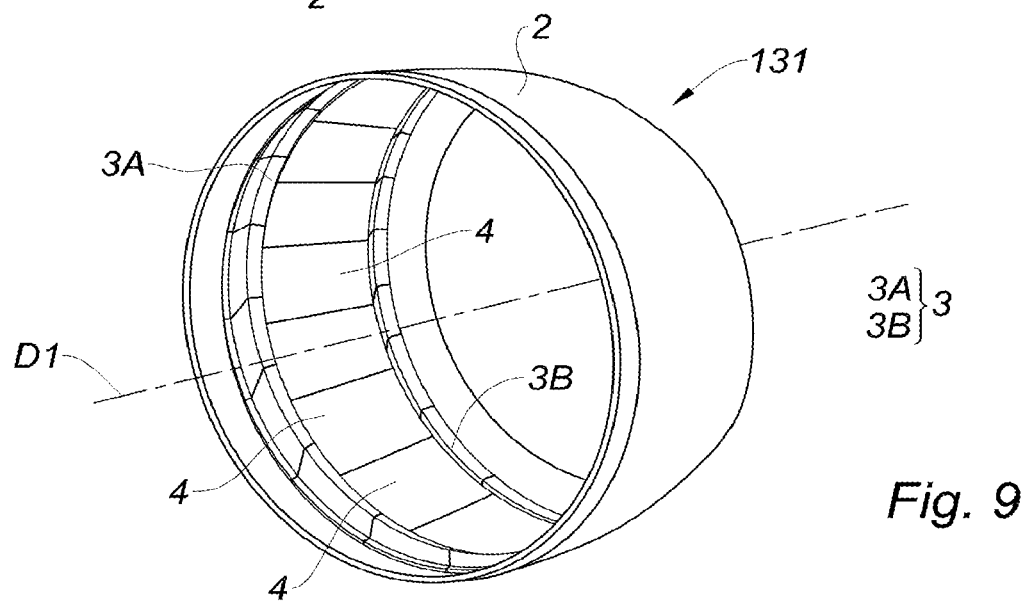
FIG. 9 is a partial schematic perspective view of an ejection cone of the exhaust conduit according to the present disclosure.
Figure 10:
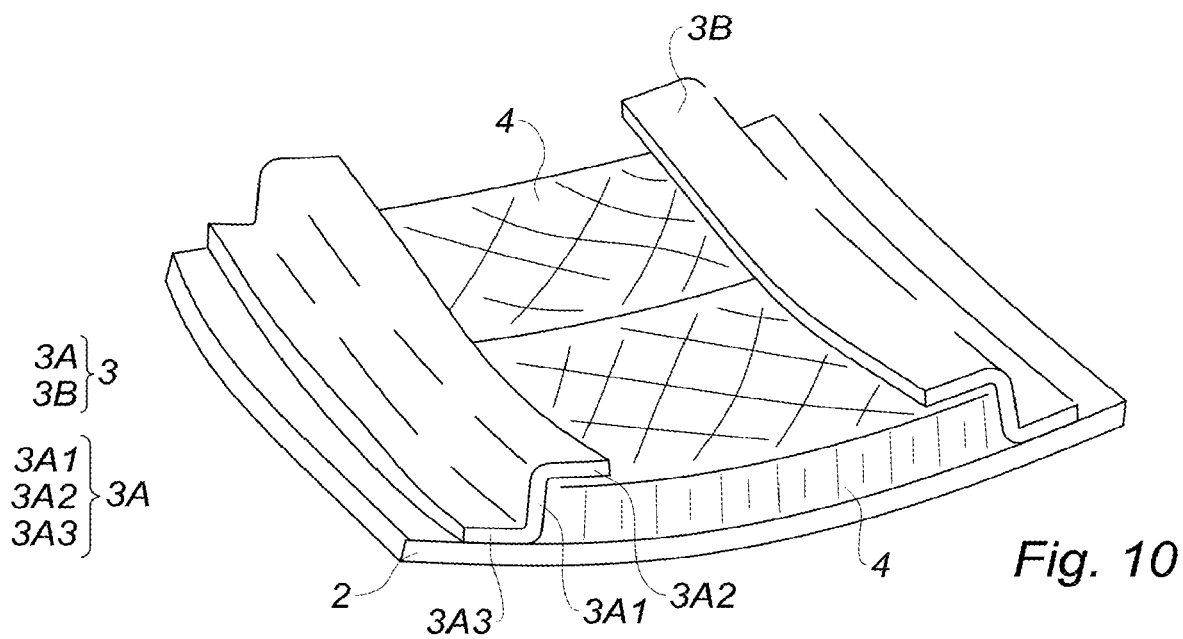
FIG. 10 is a schematic perspective view of a section of the ejection cone of FIG. 9, showing a fourth variant of the holding elements.
Figure 11:
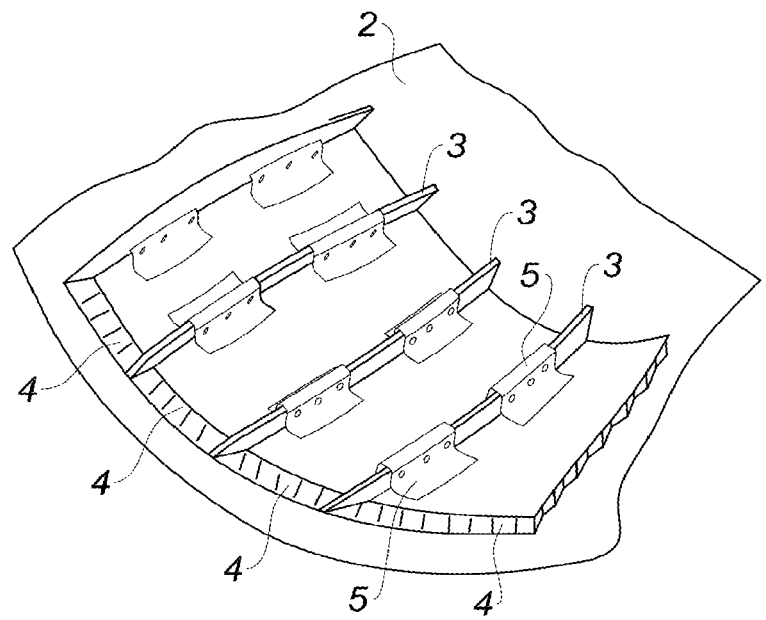
FIG. 11 is a partial schematic perspective view of a structure according to the present disclosure, comprising a fifth variant of the holding elements.

With reference to FIGS. 9 and 10, the stiffeners 3 of the structure 131 can extend circumferentially about the longitudinal axis D1.

In this example, several acoustic treatment modules 4 are embedded between two stiffeners 3A and 3B.

As shown in FIG. 10, the stiffeners 3A and 3B can have a "S" or "Z" section with: a first element 3A1 forming a stop for the acoustic treatment modules 4 to limit the displacement of the acoustic treatment modules 4 in a direction tangential to the first skin 2, a second element 3A2 forming a stop for the acoustic treatment modules 4 to limit the displacement of the acoustic treatment modules 4 in a direction normal to the first skin 2. The elements for holding the acoustic treatment modules 4 are thus constituted by the second elements of the stiffeners 3A and 3B and a third element 3A3 for connecting the stiffener 3A with the first skin 2, the third element 3A3 being made of the same material or assembled by mechanical fixings or by gluing or by brazing or welding.

The holding of the acoustic treatment modules 4 is made by any other suitable technique, for example those described hereinbelow.

Figure 13:
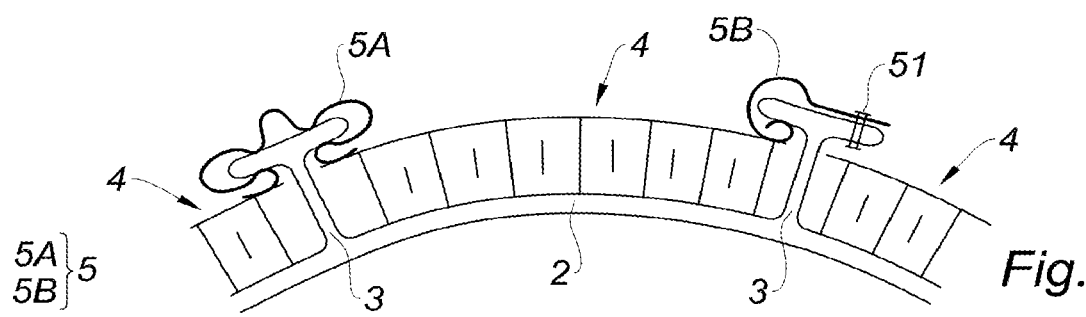
FIG. 13 is a cross-sectional partial schematic view of a structure according to the present disclosure, comprising a sixth variant of the holding elements.

In the example of FIG. 13, the stiffeners 3 have a "T" section as described above with reference to FIG. 8.

The holding elements 5 of the structure of FIG. 13 comprise elastic blades 5 fixed on the stiffeners 3.

For example, the elastic blade 5A can be wound around the head of the stiffener 3 as illustrated in FIG. 13 (elastic blade 5A on the stiffener 3 on the left of the figure). In this example, the elastic blade 5A extends on either side of the stiffener 3 so as to bear against the second skin of the acoustic treatment modules 4 located on either side of this stiffener 3 to exert a force for holding the acoustic treatment modules against the first skin (see FIG. 13, stiffener 3 on the left).

Another holding mode comprises fixing the elastic blade 5B using fixing elements 51 which may be bolts or rivets (elastic blade 5B on the stiffener 3 to the right of FIG. 13). In this example, the elastic blade 5B extends on one side of the stiffener 3 so as to bear against the second skin of the acoustic treatment module 4 located on this side of the stiffener 3 (see FIG. 13, stiffener 3 on the right).

Figure 14:
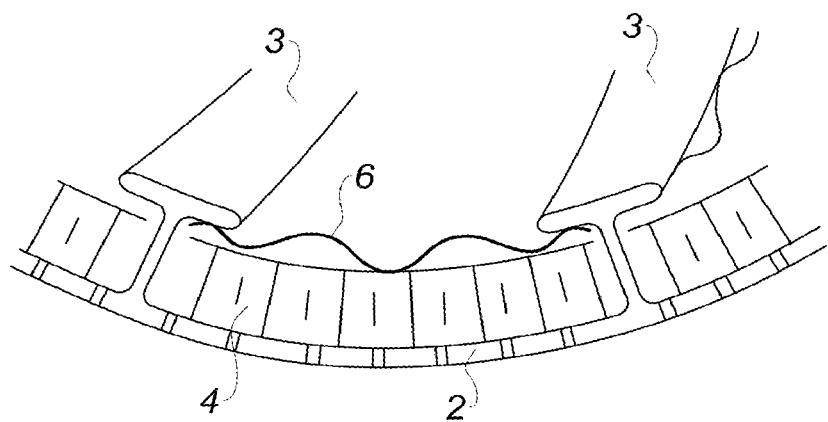
FIG. 14 is a partial schematic perspective view of the structure of FIG. 8, further comprising transverse elastic elements.

In the form of FIG. 14, in which the stiffeners 3 are of the type described above with reference to FIG. 8, the holding elements comprise transverse elastic elements 6 arranged to exert transverse pressure on the acoustic treatment modules 4 against the first skin 2, so as to immobilize these acoustic treatment modules in a direction normal to the first skin.

In this example, each transverse elastic element 6 covers the second skin of an acoustic treatment module 4 so as to be in contact on the one hand with a portion of the stiffeners 3 facing this acoustic treatment module 4 and on the other hand with the second skin of this acoustic treatment module 4.

As shown in FIG. 14, the transverse elastic elements 6 can be corrugated to exert a force for holding the acoustic treatment modules 4 against the first skin 2 by several contact zones spaced from one another.

FIGS. 15 to 18 show holding elements comprising lateral elastic elements arranged to exert lateral pressure on the acoustic treatment modules 4 against the respective stiffeners 3 between which these acoustic treatment modules 4 are embedded, to immobilize these acoustic treatment modules 4 in a direction tangential to the first skin 2.

Figure 15:
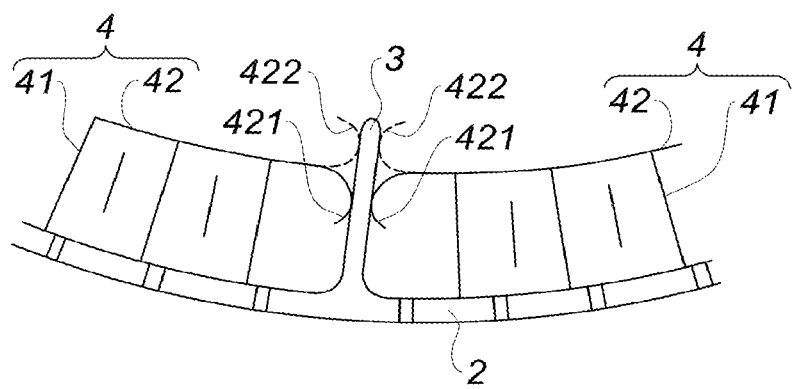
FIG. 15 is a cross-sectional partial schematic view of a structure according to the present disclosure, showing a first variant of lateral elastic elements.
Figure 16:
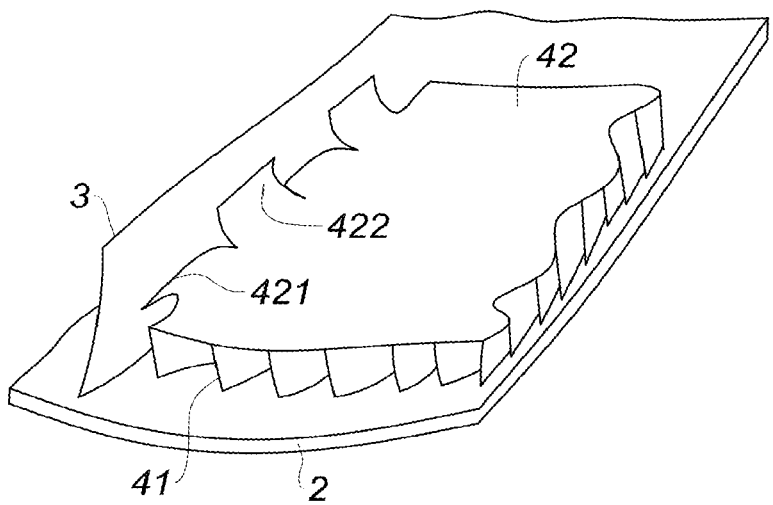
FIG. 16 is a partial schematic perspective view of the structure of FIG. 15.

In the example of FIGS. 15 and 16, the lateral elastic elements 421 and 422 are formed by the second skin 42 of the acoustic treatment modules 4, in particular by folded protuberances of the second skin 42.

Figure 17:
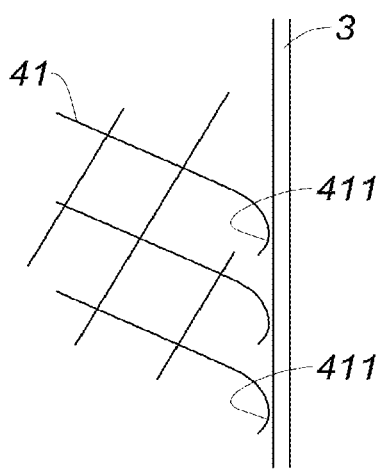
FIG. 17 is a partial schematic view in longitudinal section of a structure according to the present disclosure, showing a second variant of lateral elastic elements.

In the example of FIG. 17, the lateral elastic elements 411 are formed by the cellular core 41 of the acoustic treatment modules 4, in particular by the folds of the ends of the transverse partition walls of the cellular core.

Figure 18:
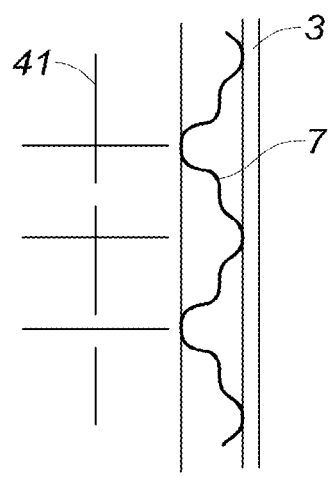
FIG. 18 is a partial schematic view in longitudinal section of a structure according to the present disclosure, showing a third variant of lateral elastic elements.

In the example of FIG. 18, a lateral elastic element 7 comprises a corrugated foil and/or can be placed between the cellular core 41 of an acoustic treatment module and a corresponding stiffener 3.

Figure 6:
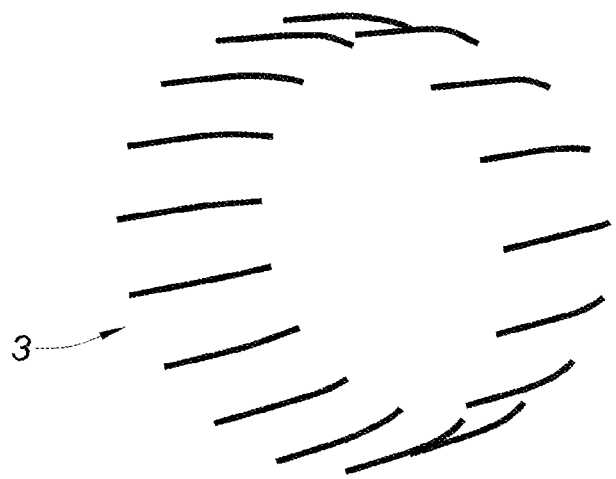
FIG. 6 is a schematic perspective view of stiffeners of the ejection cone of FIG. 5.
Figure 7:
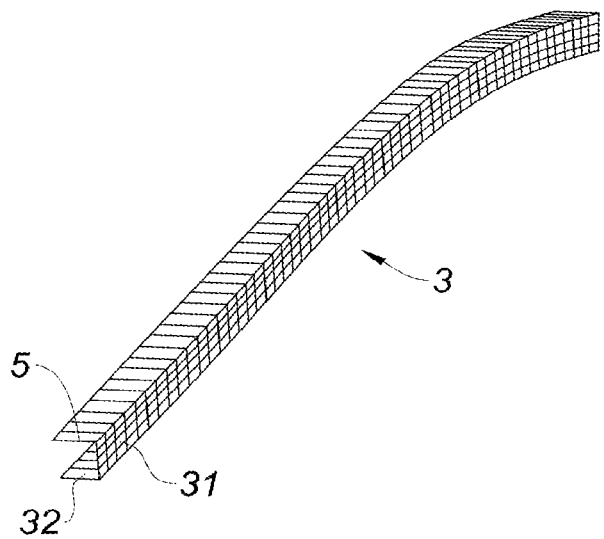
FIG. 7 is a schematic perspective view of a stiffener of the ejection cone of FIG. 5.

Another example of a structure 131 of the ejection cone type is illustrated in FIGS. 5 to 7.

In this example, each stiffener 3 comprises a first element 31 forming a stop for an acoustic treatment module 4 so as to limit the displacement of the acoustic treatment module 4 in a direction tangential to the first skin 2. Each stiffener 3 further comprises a second element 5 forming a stop for an acoustic treatment module to limit the displacement of the acoustic treatment module in a direction normal to the first skin 2. The second elements 5 of these stiffeners 3 thus constitute a portion of the holding elements.

The holding of the acoustic treatment modules 4 can be completed by at least one holding device as shown for example in FIG. 13.

For example, the structure of the form of FIGS. 5 to 7 can include elastic elements as illustrated in FIGS. 14 to 18 to hold the acoustic treatment module in pressure between stiffeners.

With reference to FIG. 7, such a stiffener 3 also comprises a third element 32 which can be embedded in the first skin 2 or which can constitute a portion of the first skin 2.

With reference to FIGS. 2 and 5 in particular, the structure 131 includes a set of longitudinal stiffeners positioned along meridians or geodesic lines of the first skin 2 (an aerodynamic surface) of the structure 131. This arrangement is associated with a number of stiffeners distributed regularly around the circumference is particularly well suited to enhance the hull eigenmodes of the tonnoid portion of the structure.

With reference to FIG. 5, the structure 131 may also include a circumferential stiffener or substantially perpendicular to the longitudinal stiffeners 3. This circumferential stiffener may have a "T" or "[" section allowing possible partial holding of the acoustic treatment modules 4, and further increasing the efficiency of all the longitudinal stiffeners in increasing the eigenmodes of the structure.

The materials used in such a structure are able to withstand the thermal and mechanical stresses to which it will be exposed during the implementation of the propulsion unit.

For example, the first skin 2 and the stiffeners 3 can be made from a composite material with a ceramic matrix, and the acoustic treatment modules 4 from a metallic material such as a titanium alloy or a nickel-based alloy.

Of course, the present disclosure is not limited to the examples which have just been described and numerous modifications can be made to these examples without departing from the scope of the present disclosure. For example, the structure can be used to include other parts of the nacelle such as the primary nozzle of an exhaust conduit.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structure for an aircraft propulsion unit nacelle comprising:
   a first skin,
   stiffeners fixed to the first skin to stiffen the first skin, and
   acoustic treatment modules, each acoustic treatment module comprising a cellular core and a respective second skin fixed to the cellular core, each second skin of each acoustic treatment module separate from each other second skin of each other acoustic treatment module,
      the first skin and the acoustic treatment modules being arranged so that the cellular core of each acoustic treatment module is clasped between the corresponding second skin and the first skin,
      the first skin or the second skin of the acoustic treatment modules being acoustically permeable to attenuate power of acoustic waves in the cellular core of the acoustic treatment modules,
   wherein each acoustic treatment module is embedded between at least two respective stiffeners, in that each acoustic treatment module is simply bearing on the first skin and comprises holding elements arranged to hold each acoustic treatment module against the first skin.

2. The structure according to claim 1, wherein the holding elements cooperate with the respective second skin of each acoustic treatment module to exert a force for holding the acoustic treatment modules against the first skin.

3. The structure according to claim 1, wherein each stiffener comprises a first element forming a stop for one or more acoustic treatment modules to limit displacement of the acoustic treatment modules in a direction tangential to the first skin, and a second element forming a stop for one or more acoustic treatment modules to limit displacement of the acoustic treatment modules in a direction normal to the first skin, the second element constituting at least one portion of the holding elements.

4. The structure according to claim 1, wherein the stiffeners constitute at least one portion of the holding elements.

5. The structure according to claim 1, wherein the holding elements comprise elastic blades fixed on the stiffeners.

6. The structure according to claim 1, wherein the holding elements comprise one or more lateral elastic elements arranged to exert lateral pressure on the acoustic treatment modules against the respective stiffeners between which the acoustic treatment modules are embedded, to immobilize the acoustic treatment modules in a direction tangential to the first skin.

7. The structure according to claim 6, wherein the lateral or transverse elastic elements are formed by at least one of the second skin and the cellular core of the acoustic treatment modules.

8. The structure according to claim 1, wherein the holding elements comprise one or more transverse elastic elements arranged to exert transverse pressure of the acoustic treatment modules against the first skin, to immobilize the acoustic treatment modules in a direction normal to the first skin.

9. The structure according to claim 8, wherein the lateral or transverse elastic elements are formed by at least one of the second skin and the cellular core of the acoustic treatment modules.

10. The structure according to claim 1, wherein the first skin and the stiffeners comprise a composite material having a ceramic matrix.

11. The structure according to claim 1, wherein the acoustic treatment modules comprise a metallic material.

12. The structure according to claim 11, wherein the metallic material is selected from the group consisting of a titanium alloy and a nickel-based alloy.

13. An exhaust conduit of an aircraft propulsion unit nacelle comprising a structure according to claim 1.

14. An aircraft propulsion unit nacelle comprising a structure according to claim 1.

15. The aircraft propulsion unit nacelle according to claim 14, wherein the stiffeners of the structure extend in respective directions parallel to a longitudinal axis of the aircraft propulsion unit nacelle.

* * * * *

UNITED STATES PATENT AND TRADEMARK OFFICE
CERTIFICATE OF CORRECTION

PATENT NO. : 11,512,666 B2  
APPLICATION NO. : 16/921163  
DATED : November 29, 2022  
INVENTOR(S) : Florent Bouillon et al.

Page 1 of 1

It is certified that error appears in the above-identified patent and that said Letters Patent is hereby corrected as shown below:

On the Title Page

Item (63), please correct Continuation of application No. to read: PCT/FR2019/050018

Signed and Sealed this  
Fourth Day of April, 2023

Katherine Kelly Vidal  
*Director of the United States Patent and Trademark Office*